(12) United States Patent
Sunnvius

(10) Patent No.: US 9,573,203 B2
(45) Date of Patent: Feb. 21, 2017

(54) MILLING TOOL AS WELL AS A MILLING INSERT THEREFOR

(71) Applicant: SANDVIK INTELLECTUAL PROPERTY AB, Sandviken (SE)

(72) Inventor: Ulrik Sunnvius, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 163 days.

(21) Appl. No.: 14/018,626

(22) Filed: Sep. 5, 2013

(65) Prior Publication Data

US 2014/0072377 A1 Mar. 13, 2014

(30) Foreign Application Priority Data

Sep. 7, 2012 (SE) ....................... 1251004
Sep. 7, 2012 (SE) ....................... 1251005
Sep. 7, 2012 (SE) ....................... 1251006

(51) Int. Cl.
*B23C 5/20* (2006.01)
*B23C 5/22* (2006.01)
*B23C 5/06* (2006.01)

(52) U.S. Cl.
CPC ................. *B23C 5/207* (2013.01); *B23C 5/06* (2013.01); *B23C 5/2221* (2013.01); *B23C 5/20* (2013.01); *B23C 5/22* (2013.01); *B23C 2200/045* (2013.01); *B23C 2200/125* (2013.01); *B23C 2200/164* (2013.01); *B23C 2200/165* (2013.01); *B23C 2200/168* (2013.01); *B23C 2200/208* (2013.01); *B23C 2200/243* (2013.01); *B23C 2200/366* (2013.01); *B23C 2210/045* (2013.01); *B23C 2210/0435* (2013.01); *B23C 2210/168* (2013.01); *B23C 2210/282* (2013.01); *Y10T 407/1924* (2015.01); *Y10T 407/23* (2015.01); *Y10T 407/235* (2015.01)

(58) Field of Classification Search
CPC .................. Y10T 407/1936; B23C 2200/045; B23C 2200/20; B23C 2200/203; B23C 2200/208; B23C 2200/243; B23C 2200/283; B23C 2200/363; B23C 2200/268
USPC ........................................... 408/48
See application file for complete search history.

(56) References Cited

U.S. PATENT DOCUMENTS 5,466,097 A * 11/1995 Wallstrom ............. B23C 5/207
407/113
5,486,073 A * 1/1996 Satran .................... B23C 5/109
407/113

(Continued)

FOREIGN PATENT DOCUMENTS

CN 101811203 A 8/2010
CN 102500806 A 6/2012

(Continued)

*Primary Examiner* — Daniel Howell
*Assistant Examiner* — Ryan Rufo
(74) *Attorney, Agent, or Firm* — Corinne R. Gorski

(57) ABSTRACT

A milling tool has single sided and indexable milling inserts having a round basic shape. Each milling insert has a plurality of tangentially spaced-apart and alternately usable cutting edges, which individually fall archedly from a first end, situated closest to an upper reference plane, to a lowest point, from which it again rises toward a second end. A reinforcing chamfer surface included in the cutting edge is formed with an increasing width in a direction from the first end of the cutting edge toward the second end.

19 Claims, 15 Drawing Sheets

(56) References Cited

U.S. PATENT DOCUMENTS

| | | | |
|---|---|---|---|
| 6,109,152 A * | 8/2000 | Hecht | 82/160 |
| 7,607,867 B2 * | 10/2009 | Benson | 407/102 |
| 8,434,975 B2 * | 5/2013 | Choi | B23C 5/202 |
| | | | 407/100 |
| 2005/0244232 A1 * | 11/2005 | Jonsson | 407/116 |
| 2007/0009334 A1 * | 1/2007 | Edler | 407/107 |
| 2008/0181731 A1 * | 7/2008 | Wallstrom et al. | 407/116 |
| 2008/0317558 A1 * | 12/2008 | Niebauer et al. | 407/114 |
| 2009/0290946 A1 * | 11/2009 | Zastrozynski | B23B 27/141 |
| | | | 407/114 |
| 2012/0070240 A1 * | 3/2012 | Ishi | B23C 5/06 |
| | | | 407/42 |
| 2012/0251250 A1 * | 10/2012 | Morrison et al. | 407/42 |
| 2013/0129436 A1 * | 5/2013 | Hoffer | 407/102 |
| 2013/0330135 A1 * | 12/2013 | Burtscher et al. | 407/42 |
| 2013/0336732 A1 * | 12/2013 | Jansson | 407/47 |
| 2014/0030034 A1 * | 1/2014 | Lehto et al. | 407/40 |
| 2014/0086696 A1 * | 3/2014 | Fang | B23C 5/2221 |
| | | | 407/99 |
| 2014/0178135 A1 * | 6/2014 | Yamamoto | 407/42 |

FOREIGN PATENT DOCUMENTS

| | | | |
|---|---|---|---|
| DE | 29711554 U1 * | 11/1997 | B23C 5/202 |
| DE | 10006431 C1 | 9/2001 | |
| EP | 0207914 A1 * | 1/1987 | B23C 5/202 |
| EP | 1066903 A2 * | 1/2001 | B23C 5/2221 |
| EP | 2412464 A1 | 2/2012 | |
| JP | 10-263916 A * | 10/1998 | B23C 5/20 |
| JP | 11-090723 A * | 4/1999 | B23C 5/20 |
| JP | 2012-232351 A * | 11/2012 | B23C 5/20 |
| WO | WO 2009096516 A1 * | 8/2009 | B23C 5/202 |
| WO | WO 2010110009 A1 * | 9/2010 | B23C 5/202 |

\* cited by examiner

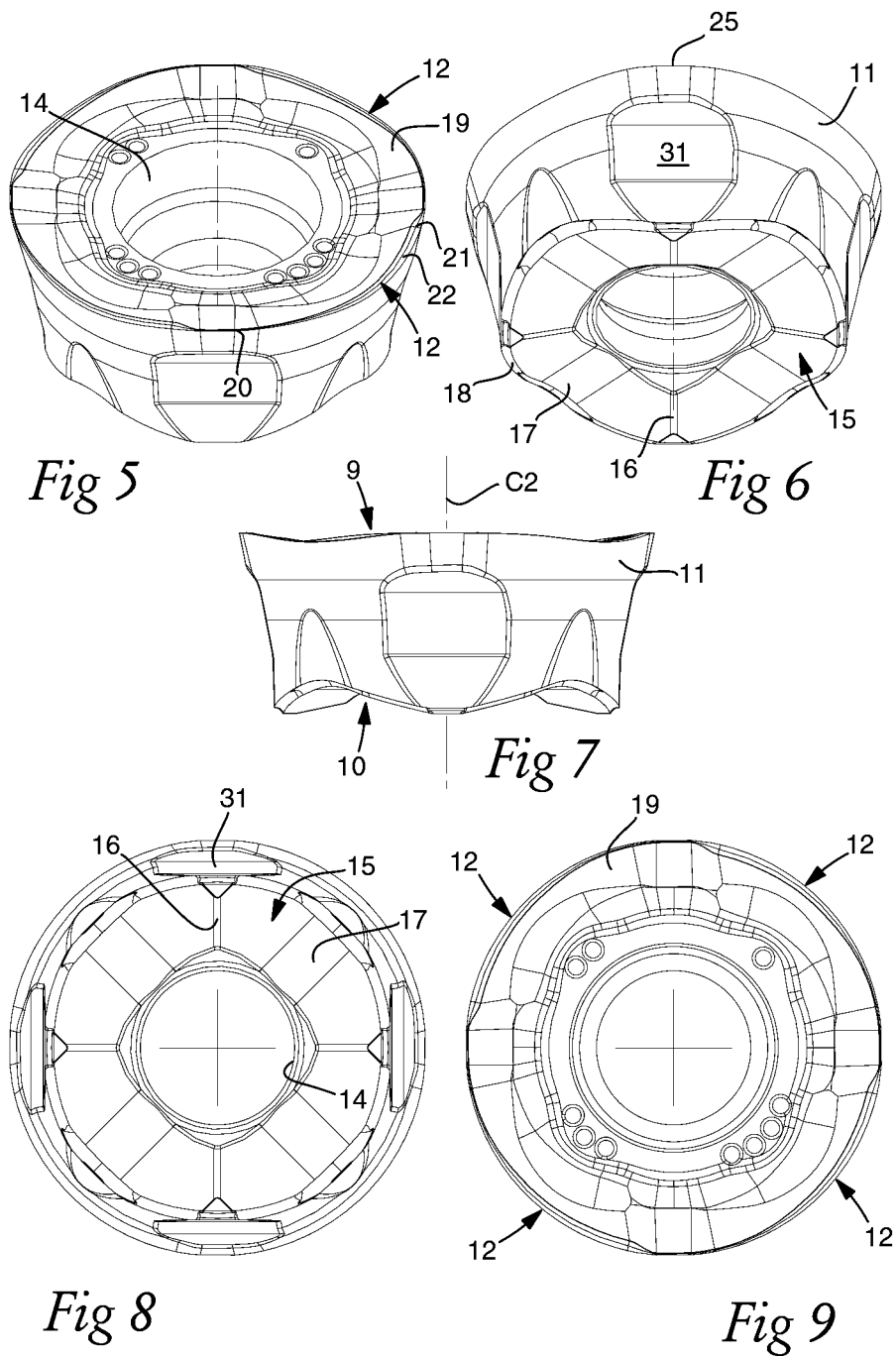

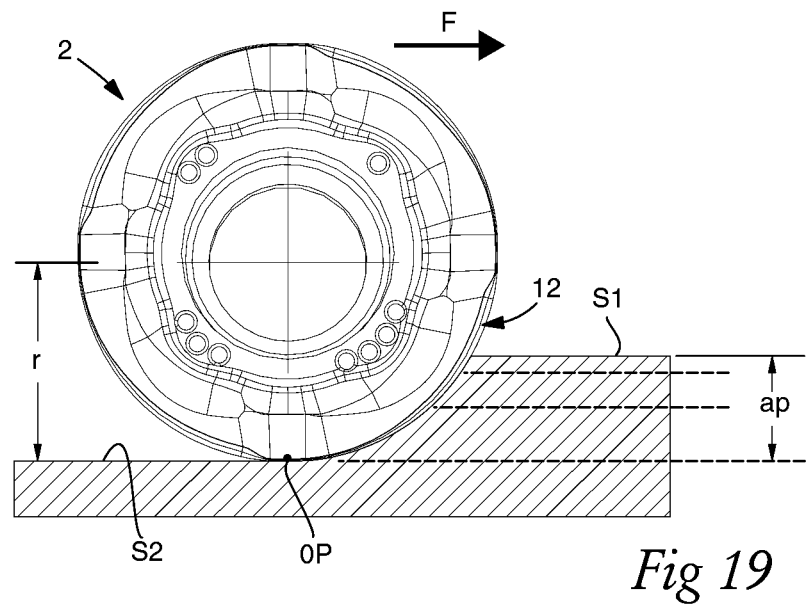
Fig 19
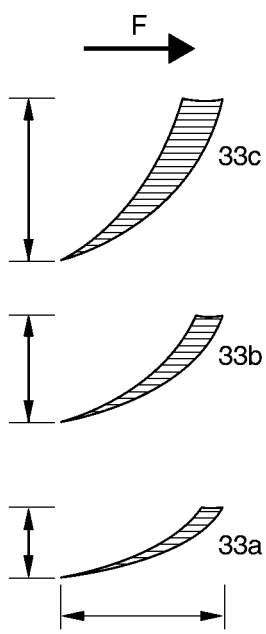

MILLING TOOL AS WELL AS A MILLING INSERT THEREFOR

RELATED APPLICATION DATA

This application claims priority under 35 U.S.C. §119 to SE Patent Application No. 1251004; 1251005 and 1250066, all filed on Sep. 7, 2012, which the entirety thereof of each is incorporated herein by reference.

TECHNICAL FIELD OF THE INVENTION

In a first aspect, this invention relates to a milling tool of the type that comprises on one hand a basic body having front and rear ends, between which there extend an envelope surface and a centre axis on which the basic body is rotatable, and on the other hand a plurality of single sided and indexable milling inserts having a round basic shape, which individually comprise an upper side, an under side, and a clearance surface that extends between the same and, at least closest to the upper side, converges toward the underside in order to provide a positive cutting geometry of a cutting edge positioned between the clearance surface and a chip surface included in the upper side, which cutting edge includes a reinforcing chamfer surface that is delimited against the clearance surface via an outer boundary line and against the chip surface via an inner boundary line, the situation of the upper and under sides in the milling insert being defined by upper and lower reference planes, each one of which extends perpendicular to a centre axis of an imaginary cylinder that circumscribes the periphery of the upper side and thereby defines the round basic shape of the milling insert, the individual milling insert being fixed in a seat recessed in a transition between the front end of the basic body and the envelope surface thereof, more precisely by means of, on one hand, a tightening device, and on the other hand co-operating lock means in the basic body as well as in the milling insert so as to counteract rotation of the last-mentioned one, besides which the milling insert is located in a spatial position that is tipped-in in the basic body and determined by an axial tipping-in angle as well as by a radial one.

In a second aspect, the invention relates in addition to a milling insert as such, viz. a single sided, indexable milling insert having a round basic shape.

BACKGROUND OF THE INVENTION AND PRIOR ART

Round milling inserts for milling purposes have the advantage in comparison with polygonal milling inserts having straight cutting edges in that they lack fragile corners. For this reason, the same are advantageously used in applications where the milling cutter should be able to mill off or remove large amounts of material from the work piece without considerable requirements of surface smoothness of the generated surface. The fact that the round milling inserts as a consequence of their arched cutting edges giving rise to wave formations in the generated surface is accordingly incidental in comparison with the capacity of the milling inserts to remove deep material layers from the work piece. Round milling inserts are found in single sided as well as double-sided embodiments, the first-mentioned ones of which are formed with cutting edges only along the upper sides and therefore can be given a positive insert macro geometry, while the insert macro geometry of the last-mentioned ones is negative as a consequence of cutting edges being formed along the upper side as well as the underside.

The invention only concerns itself with the first-mentioned type of milling inserts, i.e., single sided, indexable milling inserts having a round basic shape and positive insert macro geometry.

Generally, milling inserts having a positive insert macro geometry are more easy-cutting, concerning generated cutting force, than double-sided, negative milling inserts because the cutting edge is introduced under the chip so as to, like a knife or wedge, lift out and cut the chip rather than pushing the same in front of itself during shearing. Nevertheless, also single sided, round milling inserts are subjected to considerable cutting forces, among other things as a consequence of the chip obtaining an increasing thickness with increasing cutting depths. From a narrow end, the thickness of the chip increases to a maximum value, the absolute value of which depends on several factors, but above all the feed rate of the milling cutter per milling insert in the milling cutter body.

In order to strengthen the cutting edge of milling inserts in general, the same is usually formed with a chamfer surface in the transition between the clearance surface and the chip surface. In previously known inserts having a round basic shape, said reinforcing chamfer surface is of a uniform width along the entire periphery of the upper side (i.e., 360°). See, for instance, US 2009/0290946 A1. This means that the cutting edge along its entire operative arc length has one and the same geometry and strength irrespective of cutting depth and thereby irrespective of the shape of the generated chips. The cutting edge is as obtuse in the area where the chip is thin, as in the area where the same is thick. For this reason, the cutting forces will be unnecessary large at the same time as the wear-out of the cutting edge becomes uneven. To this, also the fact contributes that the known, round milling inserts have one and the same nominal clearance angle along their entire circumferential, conical clearance surface, which means that the functional clearance angles, when the milling insert is mounted in the basic body, will vary and give rise to local temperature rises in the segments where the real clearance from the red-hot material of the work piece becomes too small. Thus, the consequence of the same nominal clearance angle becomes an impaired service life of the milling insert.

OBJECTS AND FEATURES OF THE INVENTION

The present invention aims at obviating the above-mentioned disadvantages of previously known milling tools by means of round and single sided milling inserts and at providing an improved tool and milling insert, respectively. Therefore, a primary object of the invention is to provide a milling insert that is as easy-cutting as possible and the cutting edge of which, in an operative state, is optimized in view of the nature of the generated chip. Another object is to provide a milling insert that works well for small as well as great cutting depths up to a recommended maximum depth.

According to the invention, at least the primary object is attained by the milling insert being formed with a plurality of tangentially spaced-apart cutting edges, which individually fall archedly from a first end, situated closest to the reference plane of the upper side, to a lowest point, from which it rises toward a second end, besides which the inner boundary line of the chamfer surface diverges from the outer one so as to give the chamfer surface an increasing width in the direction from the first end of the cutting edge toward the second end thereof. In this way, the milling insert becomes easy-cutting on one hand as a consequence of the arc-shape of the cutting edge as viewed laterally (the cutting edge will because of this design carve into the material), and on the other hand as a consequence of the cutting edge being comparatively narrow and sharp in the area where the cutting depth is small and the chip narrow, but more obtuse and stronger with increasing cutting depth when the chip is thick, more precisely as a consequence of the increasing width of the chamfer surface from one end of the cutting edge toward the other.

Terminology

Before the invention is further described, in order to provide conceptual clarity, certain concepts vital for the understanding of the invention should be made clear. When a feature is described as "nominal", the same solely relates to the milling insert as such, i.e., without coupling to the basic body of the tool, but if the same feature is denominated "functional", the same relates to the assembled state of the no tool, i.e., with the milling insert mounted in a seat in the basic body. Furthermore, the concept "zero point" is used for the point along an active cutting edge that is farthest spaced apart in the axial direction from the basic body of the tool. In said zero point, the arched surface of the work piece subjected to chip removal transforms into a generated or exposed surface that is approximately plane.

In this connection, reference is also made to FIG. 19, which illustrates the milling insert according to the invention during operation. In the figure, S1 designates an unmachined surface of a work piece, while S2 designates the generated surface that is left after the chip removal. The arrow F indicates the feeding direction of the milling cutter, while $a_p$ designates the cutting depth in question.

BRIEF DESCRIPTION OF POSSIBLE EMBODIMENTS OF THE INVENTION

In one embodiment of the invention, the individual cutting edge of the milling insert may form a chip removing main edge, which at its first end transforms into a wiper edge, which—when the milling insert is viewed in plane elevation toward the upper side—has a radius that is greater than the radius of the main edge, such as this is determined by the outer boundary line of the chamfer surface. By forming the milling insert with a wiper edge (the radius of which may approach ∞), a surface-wiping effect is obtained along the generated surface S2. In such a way, the milling tool can be used not only for the removal of large quantities of material from the work piece, but also for providing a good surface finish of the generated surface. In other words, in such a way a versatile useful milling tool is provided, which may be utilized also in face milling operations, where requirements of surface finish are present.

In a further embodiment, the milling insert may be formed so that the nominal clearance angle thereof along the cutting edge decreases in the direction from the first end thereof—where the chamfer surface has its smallest width—toward the second end thereof. In such a way, an approximately uniform functional clearance is obtained against the work piece, along the active arc length of the cutting edge, independently of the cutting depth.

In yet an embodiment, the nominal rake angle of the cutting edge increases in the direction from the first end toward the second one. In such a way, the rake angle becomes greater (a person skilled in the art would say "more positive") toward the strongest portion of the cutting edge, i.e., where the chamfer surface has its greatest width. When the width of the chamfer surface is large a satisfactory cutting edge strength is obtained, which decreases the need of a small rake angle, for the purpose of providing a durable cutting edge, and therefore a greater, more positive rake angle can be used to reduce the generated cutting force.

In a combined embodiment, the cutting edge angle of the cutting edge—such as this is defined by the angle between the chip surface and the clearance surface in arbitrary sections along the cutting edge—may decrease in the direction from the first end of the cutting edge toward the second end thereof so as to, in such a way, combine the effects of the above-mentioned reduction of the clearance angle and the increase of the rake angle of the cutting edge.

In one embodiment, the individual chamfer surface may include two part surfaces that are separated by a dividing line from which the outer boundary line as well as the inner one diverges in the direction from the first end of the cutting edge toward the second one. In such a way, the chip removal is facilitated also along those segments of the cutting edge where the chamfer surface has its greatest total width. This embodiment entails the good effect that the cutting forces (and to a certain extent the generation of heat) are reduced in comparison with the feasible embodiment that makes use of a single, continuous chamfer surface.

In yet an embodiment, the chamfer surface included in the cutting edge may have a greatest width that is at least twice as large as its smallest width. In such a way, a good strength is guaranteed of the most exposed portion of the cutting edge.

When the chamfer surface is broken, the outer part surface thereof may have a width that in a section closest to the first end of the cutting edge is greater than the width of the inner part surface, but that in a section closest to the second end has a width that is smaller than the width of the inner part surface. In such a way, an optimum strength is combined with an optimum chip removal capacity in the different segments of the cutting edge.

In yet an embodiment, the arc length of the chamfer surface in question may amount to at least 75% of the total arc length that each cutting edge occupies of the 360° periphery of the upper side. In such a way, the milling insert can operate with a recommended maximum cutting depth that is considerably greater than half of the radius of the milling insert.

Furthermore, the outer part surface of a broken chamfer surface may have an angle to the upper reference plane that increases in the direction from the first end of the cutting edge toward the second end thereof. In such a way, an optimum combination of the chip removal capacity of the cutting edge and strength of different segments along the cutting edge is attained by the fact that the first contact of the cutting edge with the material takes place further from the still weaker area outermost of the cutting edge, i.e., the intersection between clearance surface and chip surface.

In yet an embodiment, the lock means, which have the purpose of rotationally securing the milling insert in an appurtenant seat in the basic body of the tool, may be a connecting surface that is formed in the underside of the milling insert and includes a plurality of radially oriented ridges and countersinks between the same. Such a connecting surface guarantees that the exact spatial position of the milling insert in relation to the tool body is obtained also after indexings and repeated insert replacements.

Furthermore, a plurality of tangentially spaced-apart and plane side contact surfaces may be formed in the envelope surface of the individual milling insert. By forming the milling insert with such side contact surfaces at the same time as the seat in the basic body is formed with a pair of complementary side support surfaces, a pressure-relief is attained of the stresses that in operation are applied to a screw, if such a one forms a tightening device for the fixation of the milling insert.

In the last-mentioned embodiment, the side contact surfaces of the milling insert may advantageously be located in the same radial plane as the ridges of the connecting surface of the milling insert. In such a way, the side contact surfaces may be located in the area under the wiper edges, where the milling insert has its greatest thickness and is strongest. In these areas, also the ends of the individual cutting edge are situated, which means that the side contact surfaces are separated from the lowest point (usually the centre) of the cutting edge, where the flank wear-out is great because of a great thickness of chip.

BRIEF DESCRIPTION OF THE DRAWINGS

In the drawings:

FIG. 5 is a top view of only the milling insert.

FIG. 6 is a bottom view of the milling insert.

FIG. 7 is a side view of the milling insert.

FIG. 8 is a planar view showing the underside of the milling insert.

FIG. 9 is a planar view showing the top side of the milling insert.

FIG. 19 illustrates the milling insert during operation.

DETAILED DESCRIPTION OF AN EMBODIMENT OF THE INVENTION

Figure 1:
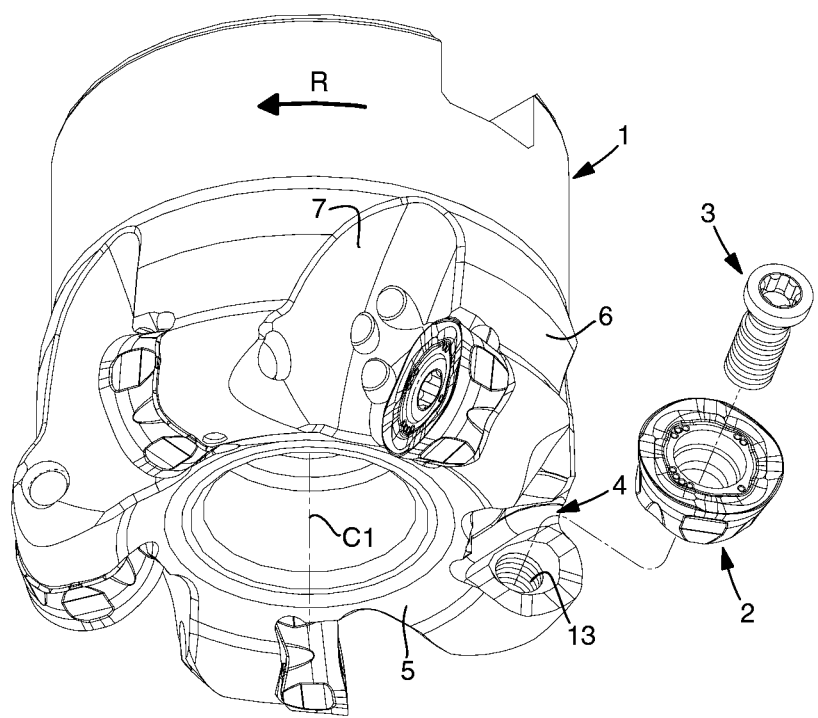
FIG. 1 is a perspective exploded view showing a milling tool according to the invention as viewed from below and having an appurtenant milling insert, as well as a fixing screw shown spaced-apart from a seat in the basic body of the tool.

In FIGS. 1-4, a milling tool is shown having a round milling insert, formed in accordance with the invention. The tool includes a basic body 1 in the form of a milling cutter head as well as a plurality of milling inserts 2. In the tool, tightening devices in the form of screws 3 are also included, which have the purpose of fixing the milling inserts in a number of seats 4 in the basic body 1. The basic body includes front and rear ends, between which a centre axis C1 extends on which the basic body is rotatable. Of the two ends, the front one is designated 5. The seats 4 are formed in the peripheral transition between the front end 5 of the basic body and an envelope surface designated 6, which is rotationally symmetrical in respect of the centre axis C1. In front of each seat 4—as viewed in the direction of rotation R—there is also a chip channel 7 for each milling insert.

Figure 2:
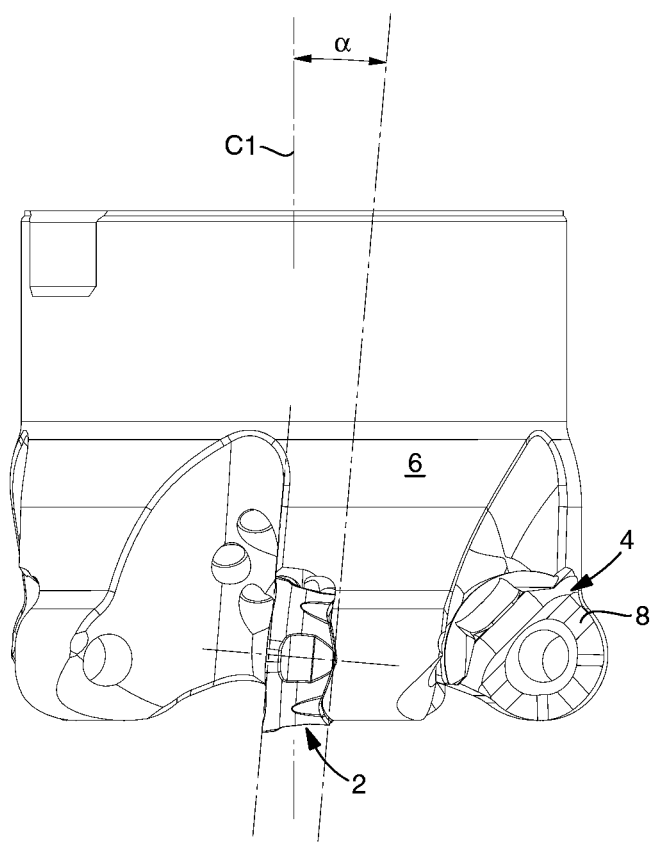
FIG. 2 is a side view of the tool.
Figure 3:
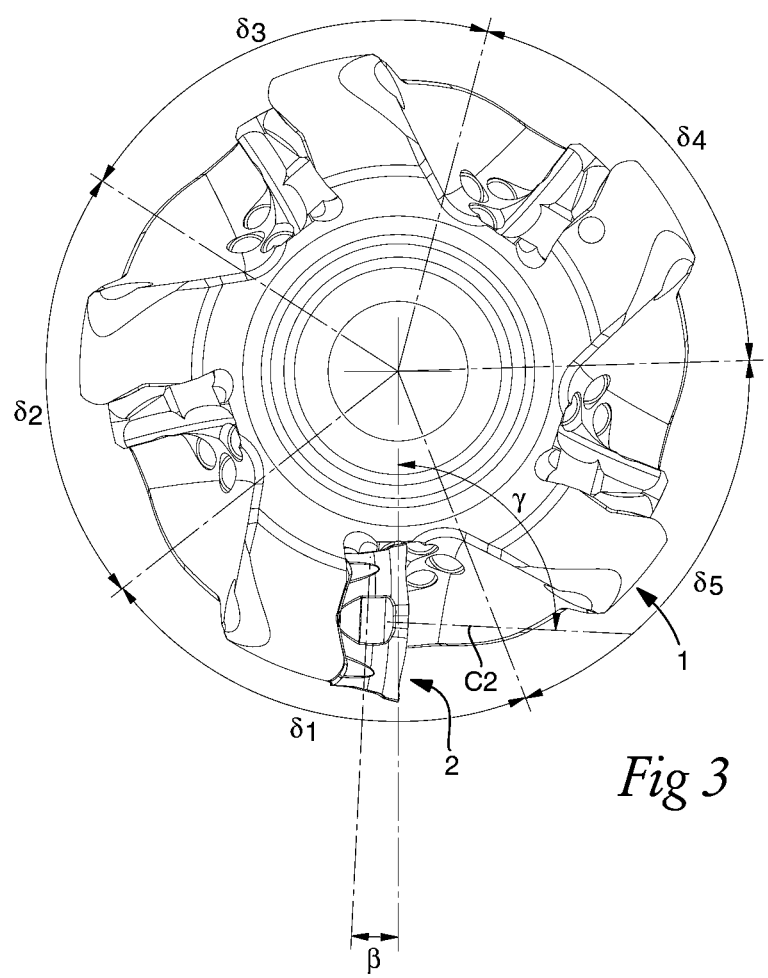
FIG. 3 is a planar view from below of the same tool.

In FIGS. 2 and 3, it is seen that each individual milling insert 2 is located in a spatial position that is tipped-in in the basic body and determined by two different angles $\alpha$ and $\beta$, $\alpha$ of which is the axial tipping-in angle of the milling insert, while $\beta$ is the radial tipping-in angle. In the example, the axial tipping-in angle $\alpha$ is positive so far that the plane thereof leans obliquely upward/rearward in relation to the centre axis C, while the radial tipping-in angle $\beta$ is negative. In the embodiment shown, $\alpha$ amounts to approx. +5°, which by a person skilled in the art is considered as a moderate angle, which entails that the milling insert obtains a good support against a bottom support surface 8 included in the seat 4, without because of this waiving the functional clearance along the active cutting edge of the milling insert. In practice, $\alpha$ may vary upward as well as downward. However, the same should not exceed +15°. The same may also be moderately negative, i.e., lean obliquely upward/forward in the direction of rotation. However, a possible negative tilt should not be greater than −5° or/to −10°.

The radial tipping-in angle $\beta$ should always be negative, i.e., not exceed 0°. In the example, $\beta$ amounts to −5°. In practice, $\beta$ may vary between 0° and −15°.

Figure 10:
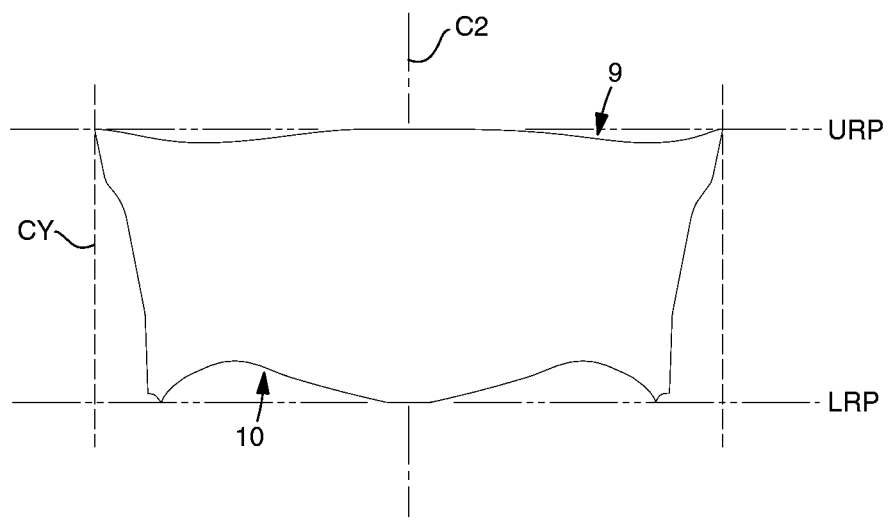
FIG. 10 is a schematic side view illustrating geometrical features of the milling insert.

Reference is now made to FIGS. 5-10, which more in detail illustrate the nature of the milling insert 2. Basal features of the milling insert are that the same includes an upper side 9, an under side 10 as well as a circumferential clearance surface 11, which generally is rotationally symmetrical in respect of a centre axis C2, and which extends between the upper and under sides. At least closest to the upper side 9, the clearance surface, in its entirety designated 11, converges toward the underside to provide a positive insert macro geometry of a cutting edge, generally designated 12, that in a traditional way is formed in the transition between the upper side and the lateral, endless clearance surface 11. As seen in FIG. 10, the situation of the upper and under sides 9, 10 in the milling insert is defined by upper and lower reference planes designated URP and LRP, respectively. These planes are mutually parallel by extending perpendicular to the centre axis C2. The last-mentioned one is a centre axis of an imaginary cylinder CY, which circumscribes the periphery of the upper side and thereby defines the round basic shape of the milling insert. In connection with FIG. 10, it should be pointed out that the upper reference plane URP is touched by a number of leveled points situated highest in the upper side, while the lower reference plane LRP in an analogous way is touched by a number of points that are situated lowest in the milling insert.

With renewed reference to FIGS. 1-4, it should be pointed out that the basic body 1 includes totally five seats, which, in order to counteract vibrations in the tool, is placed with a differentiated spacing. In the example, accordingly the pitch angle $\delta 1$ amounts to 73°, $\delta 2$ to 71°, $\delta 3$ to 72°, $\delta 4$ to 73.5°, and $\delta 5$ to 70.5°. Furthermore, it should be pointed out that a hole 13 having a female thread for the male thread of the screw 3 mouths in the bottom support surface 8 of the seat 4.

Although different types of tightening devices, such as clamps, may be used to fix the milling insert in the appurtenant seat, screws are used in the example in question. For this reason, the milling insert is formed with a through hole 14, the centre axis of which coincides with the centre axis C2 of the milling insert. As mentioned by way of introduction, the milling insert includes lock means for rotationally securing the same in the seat. In the example shown, this means is a connecting surface 15 formed in the underside 10 of the milling insert. Said connecting surface includes a plurality of ridges 16 that are mutually separated via countersinks or valleys 17, the first-mentioned ones of which form male-like engagement members and the last-mentioned ones female-like ones. As clearly seen in FIGS. 6 and 8, the ridges 16 as well as the valleys 17 extend radially in the direction from inner ends adjacent to the hole 14 toward outer ends adjacent to a circumferential transition surface 18 between the underside of the milling insert and the clearance surface 11.

In the transition between the upper side 9 of the milling insert and the circumferential clearance surface 11, a plurality of, more precisely four, cutting edges 12 are formed, which are tangentially spaced-apart from each other, and each one of which occupies ¼ of the 360° periphery of the upper side. In other words, the spacing between the cutting edges amounts in this case to 90°.

Figure 11:
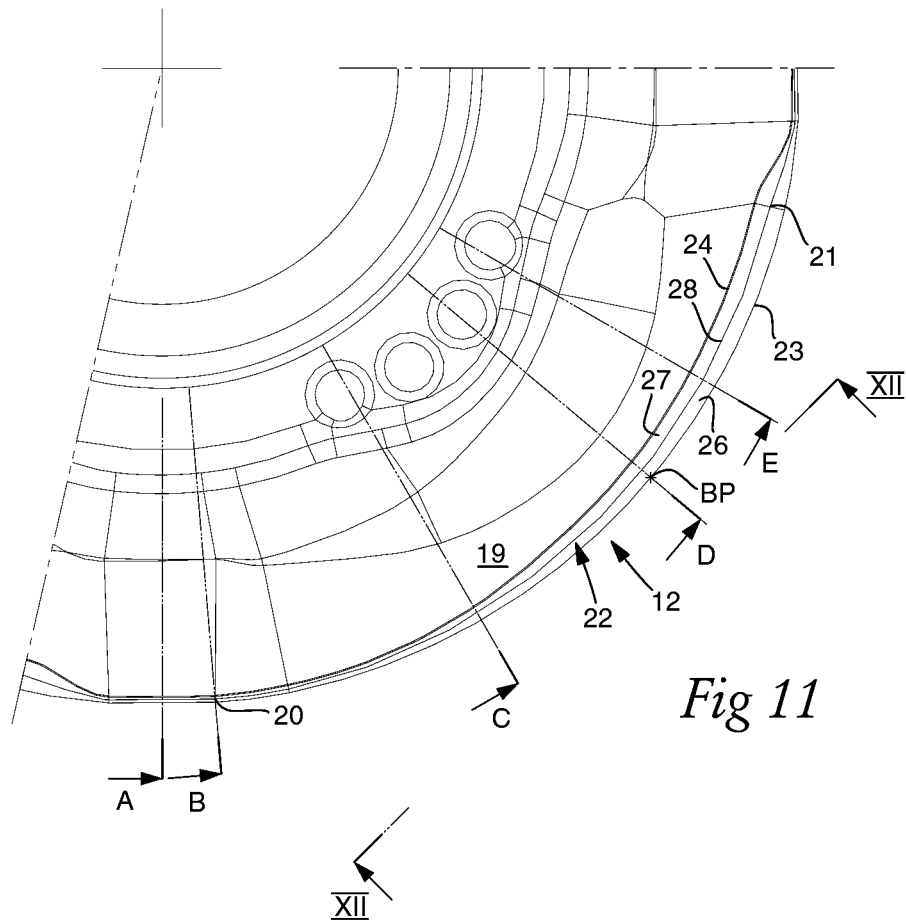
FIG. 11 is a sector-shaped enlargement of a part of the upper side of the milling insert.
Figure 12:
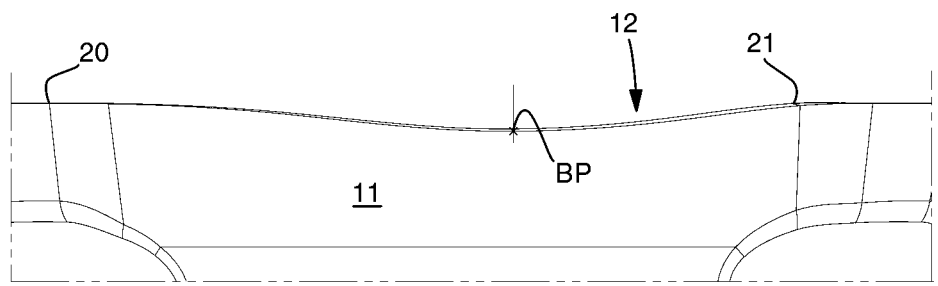
FIG. 12 is an enlarged detailed side view showing the upper part of a clearance surface included in the milling insert.
Figure 13A:
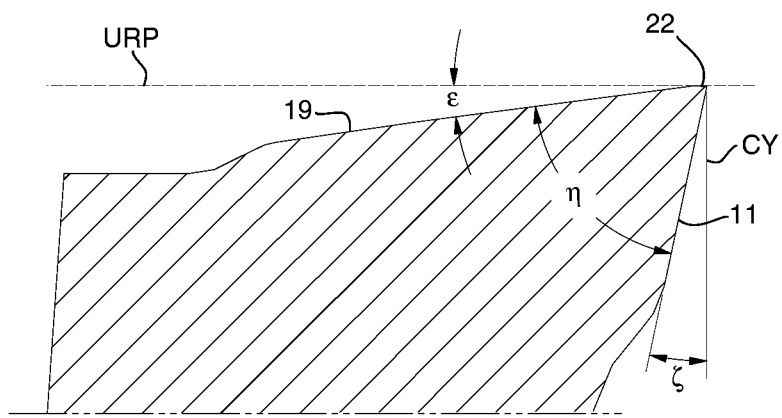
FIGS. 13a/b are enlarged detail sections (on different scales) showing the cross section shape of the cutting edge of the milling insert in the section A in FIG. 11.
Figure 13B:
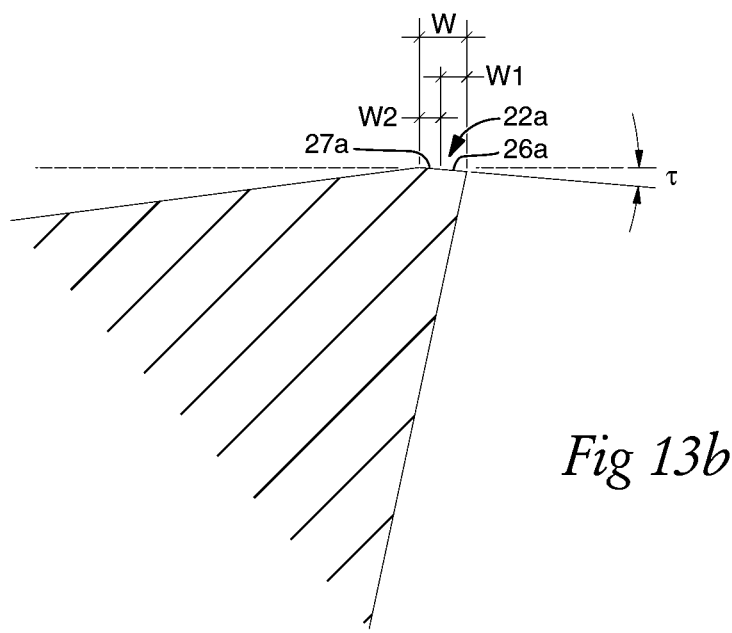
Figure 14A:
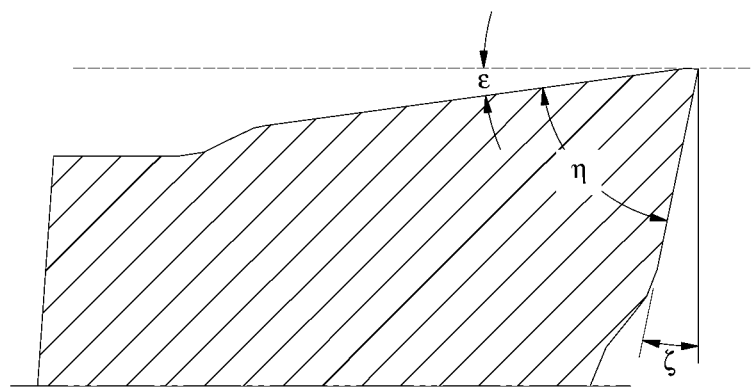
FIGS. 14a/b, FIGS. 15a/b, FIGS. 16a/b and FIGS. 17a/b are analogous detail sections of the sections DE in FIG. 11.
Figure 14B:
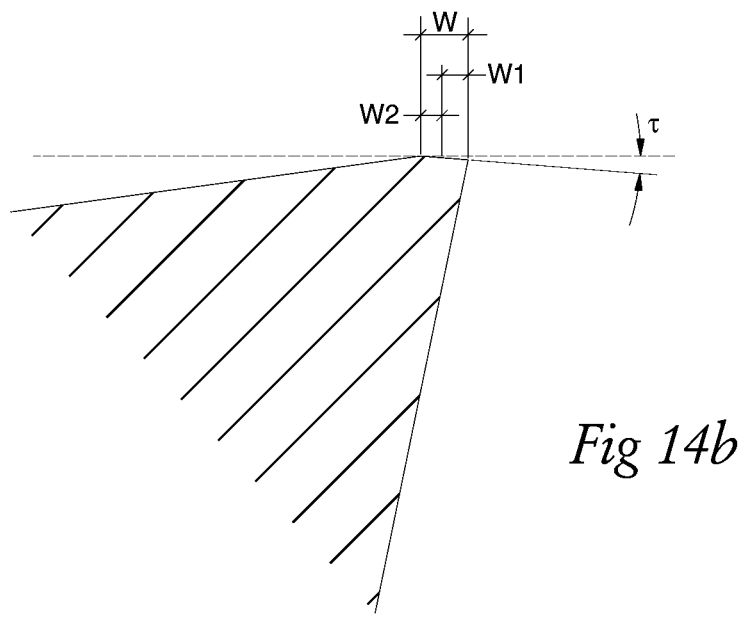
Figure 15A:
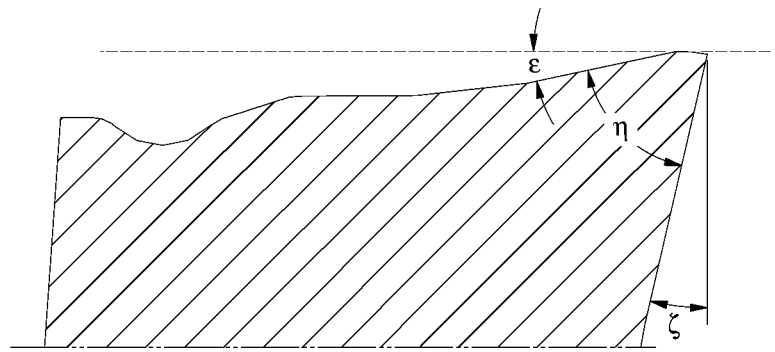
Figure 15B:
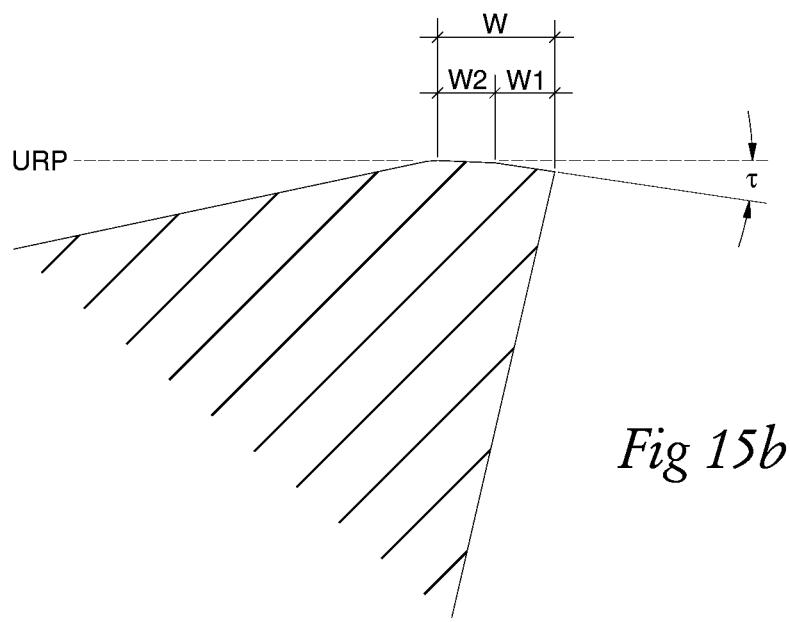
Figure 16A:
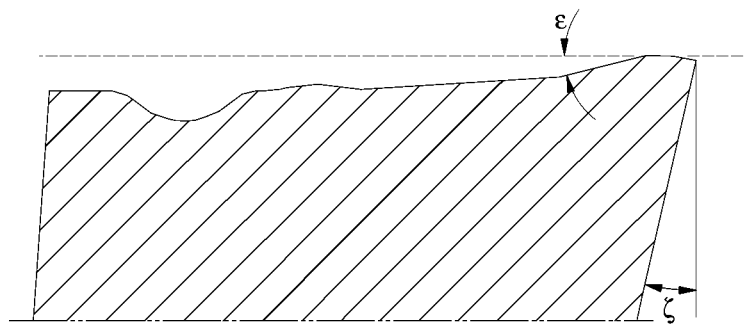
Figure 16B:
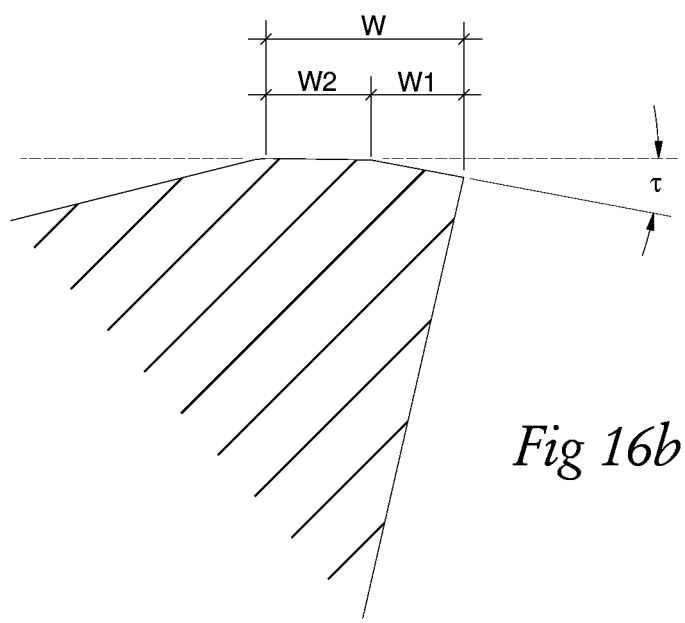
Figure 17A:
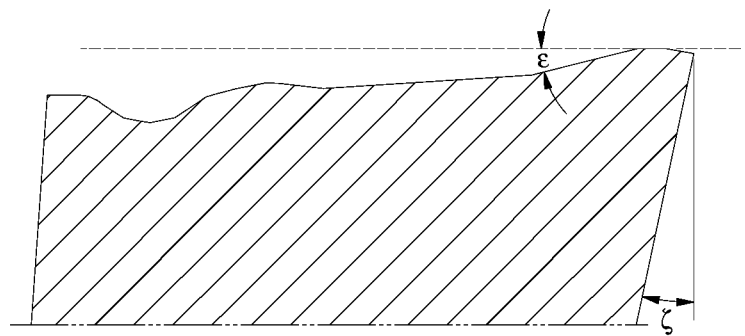
Figure 17B:
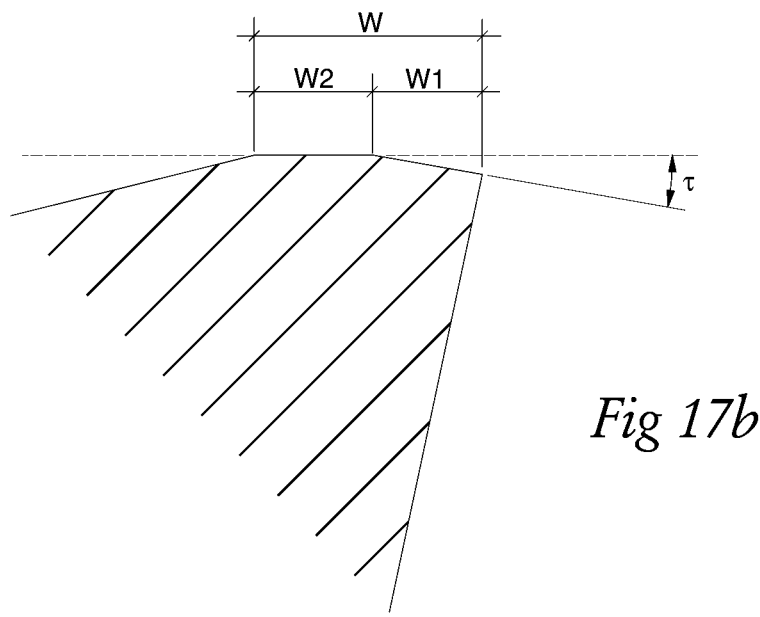

Reference is now made to FIGS. 11-18, which in more detail illustrate the design of the cutting edge 12. In FIG. 11, an enlarged, sector-shaped portion of the upper side of the milling insert is shown, more precisely as viewed in plane elevation from above. In the figure, it is seen that the cutting edge extends between first and second ends 20 and 21, respectively. In the cutting edge 12, which is formed between a chip surface 19 included in the upper side 9 and the circumferential clearance surface 11, a chamfer surface, in its entirety designated 22, is included, which is delimited against the clearance surface 11 via an outer boundary line 23, and against the chip surface 19 via an inner boundary line 24.

Two primary features characterizes the cutting edge 12, viz. that it falls archedly from the first end 20 to a lowest point or bottom point BP, from which it again rises toward the second end 21, as well as that the inner boundary line 24 of the chamfer surface 22 diverges from the outer one so as to give the chamfer surface an increasing width in the direction from the first end 20 of the cutting edge toward the second end 21. Already as a consequence of the round basic shape of the milling insert, the outer boundary line 23 is arched as viewed in plane elevation according to FIG. 11. Also as viewed in side elevation (according to FIG. 12), the boundary line extends archedly between the ends 20, 21 of the cutting edge. In other words, the boundary line 23—and thereby the cutting edge 12 as such—is arched in two different co-ordinate directions.

The cross-sectional shape of the cutting edge and chamfer surface in different segments between the ends 20, 21 is illustrated in a number of detail sections, which will be described later. Before this taking place, it should, however, be pointed out that the cutting edge 12, at its first end 20, transforms into a secondary edge or wiper edge 25, which has the purpose of wiping off or levelling the surface generated during milling. Thus, in the example shown, the cutting edge 12 forms a main edge, which guarantees the chip removal, while the secondary edge 25 forms a wiper edge having the purpose of wiping off or levelling the generated bottom surface S2 (see FIG. 19).

Figure 18:
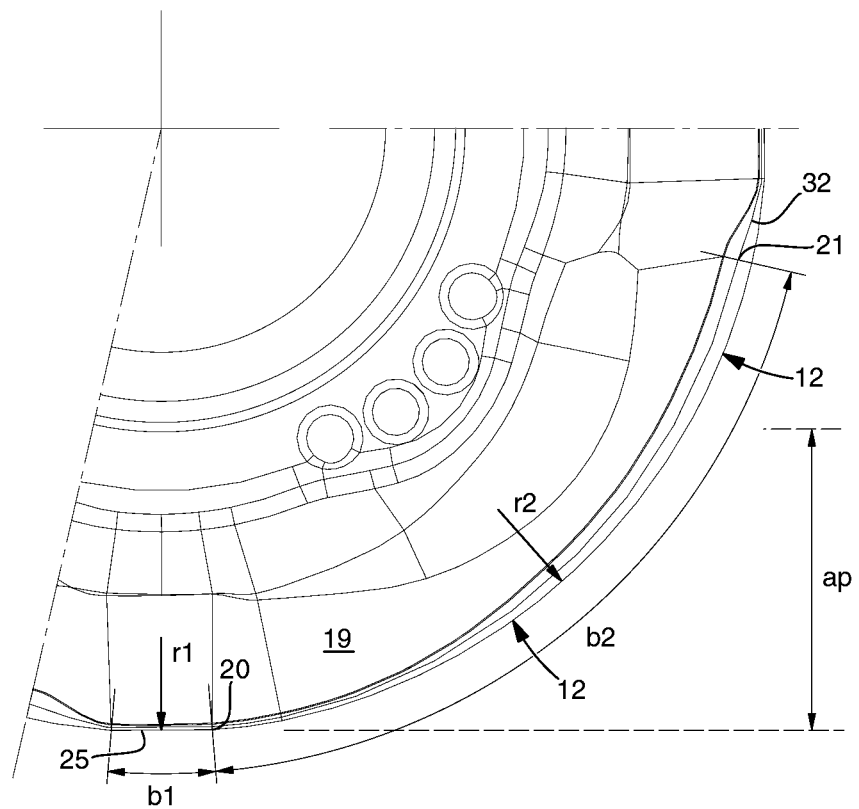
FIG. 18 is an additional detailed view showing an enlarged, sector-shaped portion of the upper side of the milling insert.

As seen in FIG. 18, the secondary edge 25 has an arc length b1 that only constitutes a fraction of the arc length b2 of the main edge 12. Furthermore, the radius r1 of the secondary edge 25 is considerably greater than the radius r2 of the cutting edge 12. The last-mentioned radius r2 amounts essentially to half of the diameter of the milling insert, while r1 in practice may approach ∞. In other words, the secondary edge 25 may have an approximately straight shape (however without becoming absolutely straight).

Reference is now made to FIGS. 13a-17b, which illustrate not only the cross-sectional shape of the secondary edge 25, but also the varying shape of the main edge 12 in different sections between the ends 20, 21. In the different figures, $\epsilon$ designates a rake angle, i.e., the angle that the chip surface 19 forms with the upper reference plane URP, while $\zeta$ designates the clearance angle that the clearance surface 11 forms with a vertical reference line or the geometrical cylinder CY. The rake angle $\epsilon$ as well as the clearance angle $\zeta$ varies along the periphery of the milling insert.

Although it is possible within the scope of the invention to form the chamfer surface 22 delimited between the boundary lines 23, 24 as a single continuous surface, in the example, it has been preferred to give the same a broken shape. Thus, the chamfer surface 22 includes two part surfaces 26, 27 (see FIG. 11) that are separated by a dividing line 28 from which the outer boundary line 23 as well as the inner 24 diverge, more precisely in the direction from the first end 20 of the cutting edge toward the second one 21. In this connection, it should particularly be pointed out that also the wiper edge 25 includes a reinforcing chamfer surface 22a, which is broken into two part surfaces 26a, 27a (see FIG. 13b).

The section B is situated at the first, narrow end 20 of the cutting edge 12, while the sections C, D and E are located closer to the opposite end 21. More precisely, the section D is placed in the vicinity of the bottom point BP, while the section E is placed closer to the end 21, although spaced apart clockwise from the same. The radially outer part surface 26 of the chamfer surface 22 forms (as well as 355 the corresponding part surface 26a along the wiper edge 25) an angle, designated $\eta$, with the reference plane URP. By those skilled in the art, said angle is denominated "negative bevel angle".

Below, a list follows of the concrete angle measures of the different sections A-E that are found in a prototype embodiment of the invention, more precisely a milling insert having an IC measure (i.e., diameter) of 12 mm. In addition, the varying width (W) of the chamfer surface 22 and the width (W1, W2) of the two part surfaces along the cutting edge are indicated in the list.

| SECTION | $\epsilon$ [°] | $\zeta$ [°] | $\eta$ [°] | $\tau$ [°] | W [mm] | W1 [mm] | W2 [mm] |
| --- | --- | --- | --- | --- | --- | --- | --- |
| A | 7.42 | 12.04 | 70.54 | 5.08 | 0.054 | 0.031 | 0.023 |
| B | 7.76 | 11.58 | 70.66 | 4.58 | 0.054 | 0.030 | 0.024 |
| C | 12.02 | 13.00 | 64.98 | 8.47 | 0.539 | 0.275 | 0.264 |
| D | 14.04 | 12.89 | 63.07 | 10.67 | 0.227 | 0.107 | 0.120 |
| E | 13.99 | 11.99 | 64.02 | 10.02 | 0.292 | 0.126 | 0.136 |

From the above list, it is seen that the cutting edge angle $\eta$ of the cutting edge—such as this is defined by the angle between the chip surface 19 and the clearance surface 11—decreases in the direction from the first end 20 toward the second one 21. This reduction of the cutting edge angle is commenced in the section B, i.e., at the first end 20 and continues up to and past the section D, i.e., a distance past the lowest situated point BP of the cutting edge. Said reduction of the cutting edge angle is, above all, caused by an increase of the rake angle ε, at the same time as the clearance angle ζ remains in all essentials constant (between 12° and 13°). From the list, it is further seen that the outer part surface 26 of the chamfer surface 22 has a width W1, which in sections closest to the first end 20 of the cutting edge is greater than the width W2 of the inner part surface 27. In an area between the sections C and D, however, this relation is altered so far that the width W1 of the outer part surface 26 becomes successively smaller than the width of the inner part surface the closer to the end 21 the sections are situated. In the exemplified embodiment, the chamfer surface has a greatest width W that is approx. ten times greater than its smallest width (cf. the values of the sections B and C). It is true that said relation may vary, but at all events the greatest width should be at least twice as large as the smallest one. The chamfer surface has its maximal width in an area between the sections C and D.

In FIG. 18, it is seen that the arc length b2 of the cutting edge between the ends 20 and 21 occupies the major part of the 90° that each one of the four cutting edges occupies of the 360° periphery of the upper side. In the example, the cutting edge occupies approx. 90% of the 90° available. At its wide, upper end 21, the cutting edge 12 transforms into an adjacent wiper edge via a tapering transition portion 30, the geometrical shape of which lacks importance because no chip removal will take place in this part of the milling insert. Also, the co-operating wiper edge 25 occupies a certain part of the available 90°. At all events, however, the arc length of the chip removing cutting edge 22 should not be less than 75% of the available arch.

Figure 4:
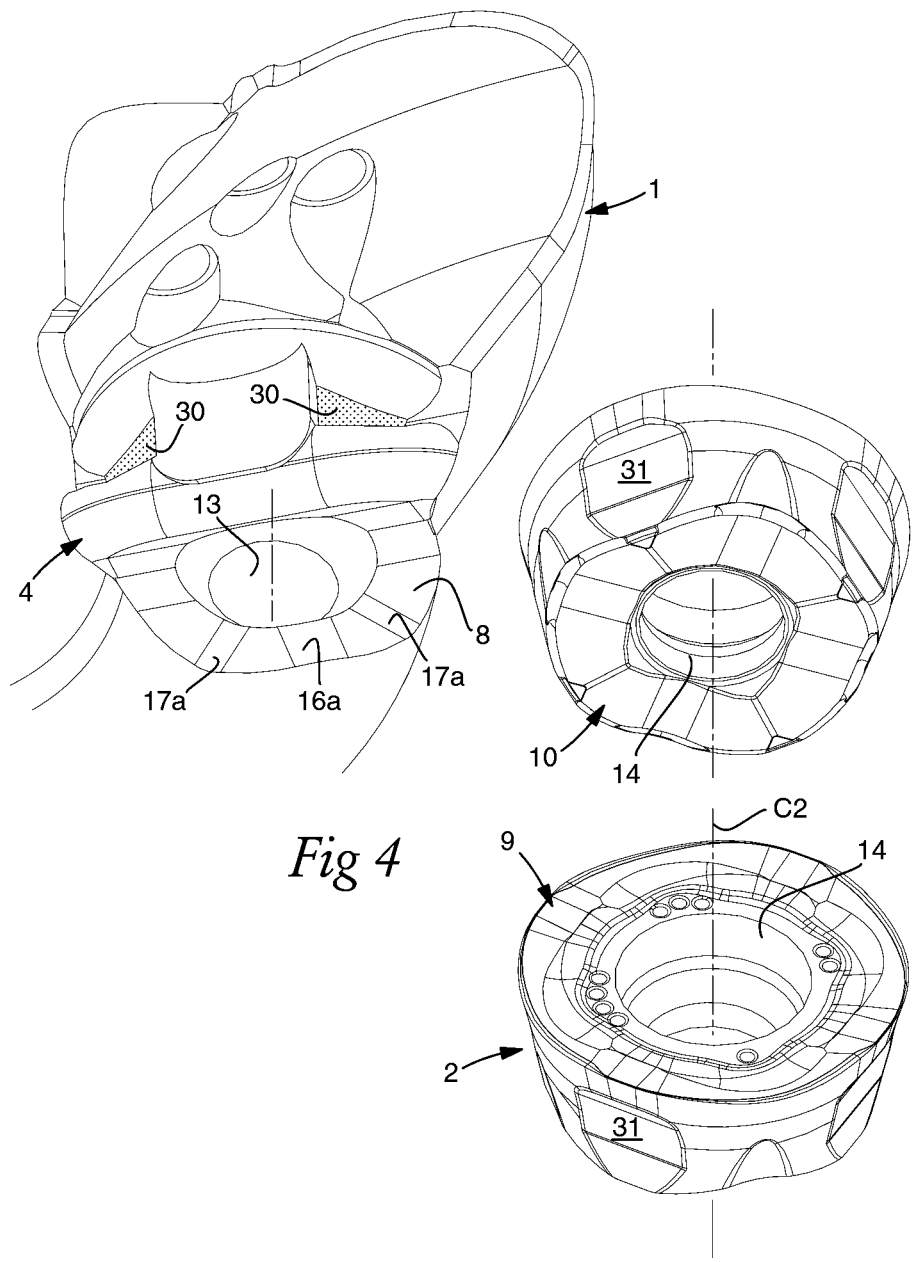
FIG. 4 is an enlarged, perspective exploded view showing a seat included in the basic body, as well as an exploded view of the milling insert in a top and bottom view.

In FIG. 4, it is seen that the bottom surface 8 of the seat 4 forms a connecting surface, which like the connecting surface 15 of the milling insert includes ridges 16a surrounded by valleys 17a. These ridges and valleys form male and female, respectively, members arranged to co-operate with the ridges and the valleys in the connecting surface of the milling insert, more precisely in such a way that the individual ridge 16 of the milling insert engages a valley 17a in the connecting surface 8 of the seat, while the ridges 16a of the connecting surface of the seat engage the valleys 17 in the milling insert. It should be noted that the two connecting surfaces in this case are essentially ring-shaped and surround the holes 13, 14 in the seat and the milling insert, respectively. In addition to the connecting surface 8 serving as bottom, also two side support surfaces 30 are included in the seat 4, which are plane and intended to co-operate with a pair of plane side contact surfaces 31 of the clearance surface 11 of the milling insert. Because the milling insert includes four cutting edges and should be indexable in four positions, the milling insert includes four such side contact surfaces 31, only two of which—depending on 415 the index position—are kept pressed against the side support surfaces 30. Primarily, the male and female members of the connecting surfaces 8, 15 counteract rotation of the milling insert, while the contact between the side support surfaces 30 and the side contact surfaces 31 has the purpose of relieving the pressure on the tightening screw 3 so that the same is not deformed under load.

As seen in FIGS. 4-7, the side contact surfaces 31 of the milling insert have a limited height in order to be housable under the cutting edge that is delimited by the upper portion of the clearance surface 11. In accordance with a preferred embodiment of the invention, the side contact surfaces 31 are placed in the same radial plane as the ridges 16 of the connecting surface 15. In one and the same radial plane as the ridge and the side contact surface 31, also the wiper edge 25 is situated. The consequence of this is that the side contact surfaces 31 are formed in those portions of the milling insert that have maximum thickness. Thus, the secondary edges 25 and the connections thereof to the surrounding cutting edges 22 are the highest situated points of the milling insert, which are tangent to the upper reference plane URP. From the wiper edges, the main edges fall in relation to the upper reference plane, and in an analogous way the periphery of the lower connecting surface 15 rises, such as this is represented by the transition surface 18 in the areas that are situated between the ridges 16, i.e., where the valleys 17 are situated. In other words, the milling insert has its smallest thickness in an area approximately halfway between two side contact surfaces 31.

Reference is now made to FIG. 19, which schematically illustrates the function of a milling insert included in the milling tool during operation. In the figure, F designates the feeding direction of the milling cutter. For a given feed, the operative cutting edge 22 will remove chips 33a, 33b and 33c, the shape/thickness of which vary depending on the selected cutting depth ap. If the cutting depth is small, the chip (see 33a) will be comparatively thin even if its thickness increases from one end to the other. With an increasing cutting depth, the thickness of the chips (33b, 33c) increase successively up to a maximum thickness that corresponds to a maximum, recommended cutting depth. This recommended maximum depth may, per se, vary in different applications. However, the cutting depth ap should not exceed ⅔ of the radius r of the milling insert.

In FIG. 19, OP designates the zero point (situated 6 o'clock) in which the chip removing effect of the cutting edge 22, via the wiper edge 20, transforms into a surface-wiping effect along the generated surface S2.

By forming the individual cutting edge in the way described above, its chip removing capacity is optimized independently of the selected cutting depth. If the cutting depth is small, only the pointed and easy-cutting part of the cutting edge, which is situated closest to the wiper edge, starts to function. In these circumstances, the cutting forces are limited, and therefore said part of the cutting edge is not subjected to any greater cutting forces tending to wear out or damage the milling insert. If the thickness of the chip—as a consequence of an increased cutting depth—increases, the cutting edge is subjected to greater cutting forces, in particular where the cutting depth is greatest and the chip thickest. Also in these circumstances, the cutting edge is durable because the chamfer surface thereof will be wider and wider from the wiper edge toward the upper end of the cutting edge. However, the cutting edge does not lose its easy-cutting capacity because the arched sagging of the cutting edge in relation to the upper reference plane of the milling insert ensures that the functional axial angle of the cutting edge increases, and thereby compensates a moderate axial tipping-in angle.

Figure 20A:
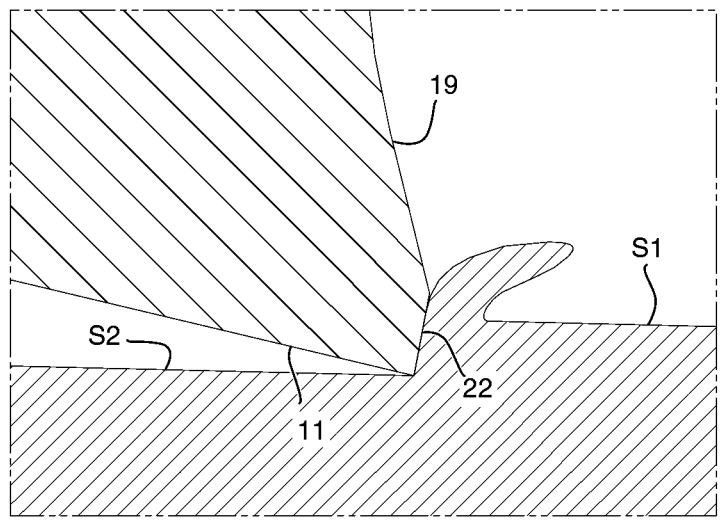
FIGS. 20a/b are schematic illustrations of the chip formation of milling inserts having non-uniform chamfer surfaces along the cutting edges.
Figure 20B:
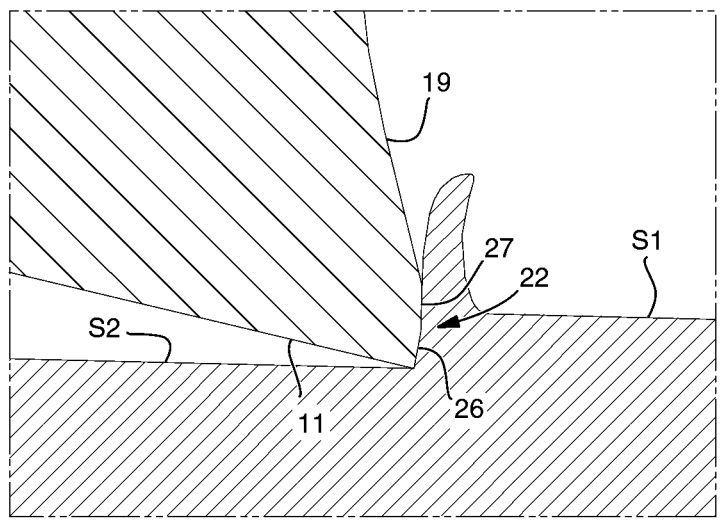

In FIGS. 20a and 20b, there is illustrated a comparison between a cutting edge, the chamfer surface 22 of which is continuous and a cutting edge having a broken one, i.e., a chamfer surface that—in accordance with the described embodiment—includes two part surfaces 26, 27 oriented at an obtuse angle to each other. In the first-mentioned case (FIG. 20a), the chip, which is subject to removal, will be folded down in the forward direction from the cutting edge. This means that the cutting forces become greater than in the case that is shown in FIG. 20b. By the fact that the inner part surface 27 is angled downward/rearward in relation to the outer part surface 26, the chip will be guided more inward toward the centre of the milling insert (upward in FIG. 20b).

In such a way, the chip will slide easier along the cutting edge, whereby the cutting forces are reduced.

The invention claimed is:

1. A milling tool comprising:
a basic body having front and rear ends, between which there extends an envelope surface and a first center axis on which the basic body is rotatable;
a plurality of single sided and indexable milling inserts having a round basic shape, which individually include an upper side, an under side, and a clearance surface that extends between the upper and lower side, a portion of the clearance surface bordering the upper side converging toward the underside to provide a positive cutting geometry of a cutting edge positioned between the clearance surface and a chip surface included in the upper side, the cutting edge including a reinforcing chamfer surface that is delimited against the clearance surface via an outer boundary line and against the chip surface via an inner boundary line, the upper and under sides in the milling insert being determined by upper and lower reference planes, each of the reference planes extending perpendicular to a second center axis of an imaginary cylinder that circumscribes the periphery of the upper side and defines the round basic shape of a milling insert, wherein in the clearance surface of the individual milling insert, a plurality of tangentially spaced-apart and plane side contact surfaces are formed, two of which are pressed against a side support surface in the seat; and
a seat formed in a transition between the front end and the envelope surface of the basic body, wherein each of the plurality of milling inserts being fixed in the seat by a tightening device and co-operating lock means disposed in the seat of the basic body and the respective milling insert so as to counteract rotation of the milling insert, the milling insert being located in a spatial position that is tipped-in in the basic body and determined by an axial tipping-in angle, as well as by a radial angle, wherein each of the plurality of milling inserts is formed with a plurality of tangentially spaced-apart and alternately usable cutting edges, each of the cutting edges falling archedly from a first end bordering the upper reference plane of the milling insert, to a lowest point, from which a respective cutting edge rises toward a second end, the inner boundary line of the chamfer surface diverging from the outer boundary line so as to give the chamfer surface an increasing width in a direction from the first end of the cutting edge toward the second end thereof, wherein the lock means for rotationally securing each milling insert in the individual seat of the basic body has a first connecting surface that is formed in a bottom of the individual seat and includes a plurality of radially oriented ridges and countersinks between the ridges, and a second connecting surface that is formed in the underside of the milling insert, the second connecting surface including a plurality of radially oriented ridges and countersinks, the ridges of the second connecting surface engaging the countersinks of the first connecting surface at the same time as countersinks of the second connecting surface receive the ridges of the first connecting surface, the side contact surfaces of the milling insert being located in the same radial plane as the ridges of the second connecting surface of the milling insert.

2. A milling tool according to claim 1, wherein an individual cutting edge of the milling insert forms a chip removing main edge, which at its first end transforms into a wiper edge, which when the milling insert is viewed in plane elevation toward the upper side, has a radius that is greater than a radius of the main edge as determined by the outer boundary line of the chamfer surface.

3. A milling tool according to claim 1, wherein an individual cutting edge of each milling insert is formed with a cutting edge angle defined by an angle between the chip surface and the clearance surface that decreases in a direction from the first end toward the second end.

4. A milling tool according to claim 3, wherein the individual cutting edge of each milling insert is formed with a nominal rake angle that increases in a direction from the first end toward the second end, while a clearance angle formed by the clearance surface and a vertical reference line of the imaginary cylinder is constant.

5. A milling tool according to claim 1, wherein the chamfer surface of each cutting edge is broken into two part surfaces that are separated by a dividing line from which the outer boundary line and the inner boundary line diverge in a direction from the first end of the cutting edge toward the second end, the radially outer part surface forming a greater, negative angle with the upper reference plane than the inner part surface.

6. A milling tool according to claim 1, wherein the chamfer surface of the cutting edge has a greatest width that is at least twice as large as its smallest width.

7. A milling tool according to claim 5, wherein the outer part surface of the chamfer surface has a width, which in sections closest to the first end of the cutting edge is greater than a width of the inner part surface, but which in sections closer to the second end has a width that is smaller than the width of the inner part surface.

8. A milling tool according to claim 1, wherein the chamfer surface of each cutting edge has an arc length of at least 75% of the total arc length of each cutting edge.

9. A milling tool according to claim 5, wherein an angle of the outer part surface to the upper reference plane of each milling insert increases in the direction from the first end of the cutting edge toward the second end.

10. A milling tool according to claim 1, wherein the operative cutting edge of each milling insert has its first end situated at a greater axial distance from the rear end of the basic body than its second end, and the operative cutting edge of the milling insert has its first end situated at a shorter radial distance from the first center axis of the basic body than its second end.

11. A single sided, indexable milling insert comprising:
a round basic shape having an upper side, an under side, and a clearance surface that extends between the upper and lower side, a portion of the clearance surface bordering the upper side converging toward the underside to provide a positive cutting geometry of a cutting edge positioned between the clearance surface and a chip surface included in the upper side, the cutting edge including a reinforcing chamfer surface that is delimited against the clearance surface via an outer boundary line and against the chip surface via an inner boundary line, the upper and under sides being defined by upper and lower reference planes, each one of which extends perpendicular to a second center axis of an imaginary cylinder that circumscribes the periphery of the upper side to define the round basic shape of the milling insert, wherein in the clearance surface of each individual milling insert, a plurality of tangentially spaced-apart and plane side contact surfaces are formed; and
lock means for rotationally securing the milling insert, a plurality of tangentially spaced-apart cutting edges, each of the cutting edges individually fall archedly from a first end, situated closest to the upper reference plane, to a lowest point, from which it rises toward a second end, the inner boundary line of the chamfer surface diverging from the outer boundary line to give the chamfer surface an increasing width in the direction from the first end of the cutting edge toward the second end there, wherein the lock means is a connecting surface that is formed in the underside and includes a plurality of radially oriented ridges and countersinks between the ridges, the side contact surfaces of the milling insert being located in a same radial plane as the ridges of the connecting surface.

12. A milling insert according to claim 11, wherein the cutting edge forms a chip removing main edge, which at its first end transforms into a wiper edge, which when the milling insert is viewed in a plane elevation toward the upper side has a radius that is greater than a radius of the main edge determined by the outer boundary line of the chamfer surface.

13. A milling insert according to claim 11, wherein the individual cutting edge of each milling insert is formed with a cutting edge angle formed between the chip surface and the clearance surface the cutting edge angle decreasing in a direction from the first end toward the second end.

14. A milling insert according to claim 11, wherein the individual cutting edge of each milling insert is formed with a nominal rake angle of the cutting edge increasing in a direction from the first end toward the second end, while a clearance angle formed by the clearance surface and a vertical reference line of the imaginary cylinder is constant.

15. A milling insert according to claim 11, wherein the individual chamfer surface is broken into two part surfaces that are separated by a dividing line from which the outer boundary line and the inner boundary line diverges in a direction from the first end of the cutting edge toward the second end thereof, the radially outer part surface forming a greater, negative angle with the upper reference plane than the inner part surface.

16. A milling insert according to claim 11, wherein the chamfer surface has a greatest width that is at least twice as large as its smallest width.

17. A milling insert according to claim 15, wherein the outer part surface of the chamfer surface has a width, which in sections closest to the first end of the cutting edge is greater than a width of the inner part surface, and in sections closer to the second end has a width that is smaller than a width of the inner part surface.

18. A milling insert according to claim 11, wherein an arc length of the chamfer surface is at least 75% of a total arc length of each cutting edge.

19. A milling insert according to claim 15, wherein the angle between the outer part surface and the upper reference plane increases in a direction from the first end of the cutting edge toward the second end thereof.

* * * * *